April 10, 1951 J. B. CARAWAY 2,548,770
PROTECTIVE ARRANGEMENT FOR THE NEUTRALIZATION CIRCUITS OF VACUUM TUBES
Filed May 30, 1945
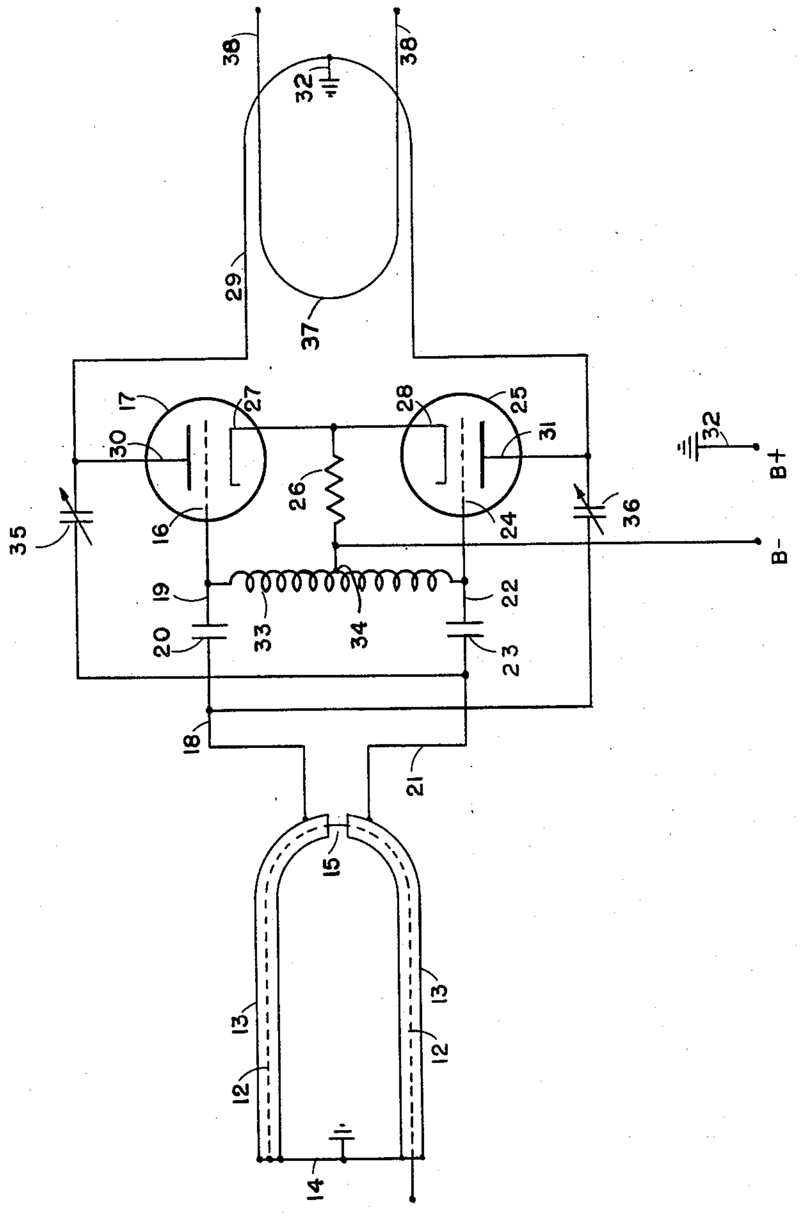
INVENTOR.
JOHN B. CARAWAY
BY
William D. Hall.
ATTORNEY Patented Apr. 10, 1951

2,548,770

UNITED STATES PATENT OFFICE 2,548,770

PROTECTIVE ARRANGEMENT FOR THE NEUTRALIZATION CIRCUITS OF VACUUM TUBES

John B. Caraway, Evansville, Ind., assignor to the United States of America as represented by the Secretary of War Application May 30, 1945, Serial No. 596,721

3 Claims. (Cl. 179—171)

The present invention relates to electric circuits and more specifically to circuits for the neutralization of interelectrode capacities in vacuum tubes.

One of the objects of this invention is to remove the neutralizing condensers from circuits containing high potential and to place them in circuits so that the only voltage impressed across their plates is the relatively small radio frequency component of the voltage. This is accomplished by maintaining the vacuum tube plates and the points at which the neutralizing condensers are connected to the grid circuits at ground potential insofar as the direct current component is concerned and isolating the grids from these circuits by blocking condensers in order to maintain the proper direct current bias on the grids.

An advantage of the present invention lies in economy of structure since the circuits in which the invention is embodied permit the use of low breakdown voltage neutralizing condensers.

Another advantage is the added safety to the operator in that all components needed to be adjusted for complete neutralization are free from any direct current high potential.

Other objects, features, and advantages of the present invention will suggest themselves to those skilled in the art and will become apparent from the following description of the invention taken in connection with the accompanying drawing.

The preferred embodiment of the invention is shown in the drawing applied to a cross-neutralized push-pull amplifier employing two triodes, but it is to be understood that it can be readily used with a single tube or a plurality of tubes in cascade or in parallel.

Referring to the drawing, the input circuit consists of a loop having a center conductor 12 upon which the radio frequency input is impressed and which has a length equivalent to one half the wavelength of the frequency of the input and a surrounding shield 13 grounded at both ends by conductor 14 and split at its midpoint 15. The radio frequency input is fed from one half of the shield 13 to the grid 16 of tube 17 through conductors 18 and 19 and blocking condenser 20. It is similarly fed from the other half of shield 13 through conductors 21 and 22 and condenser 23 to grid 24 of tube 25. Resistor 26 provides the bias for the grids 16 and 24 with respect to their respective cathodes 27 and 28, connected in push-pull relationship, by reason of the voltage drop across it caused by the cathode currents.

The output circuit consists of a loop 29 connected between the plates 30 and 31 of the tubes 17 and 25. The output loop 29 is grounded at its midpoint 32 which represents the positive side of the source of high direct current potential designated as B+.

Any conventional circuit such as a hairpin loop 37 may be provided for useful application of the load at terminals 38, 38. Inductance 33 is connected across the grid conductors 19 and 22 and its midpoint 34 is connected to the bias resistor 26 to maintain the grids 16 and 24 at the same negative direct current potential and at the same time to allow them to remain with respect to the radio frequency component in the phase relationship produced by the input loop 12, 13.

The neutralizing circuits include adjustable capacitors 35 and 36. Capacitor 35 is connected from plate 30 of tube 17 to a point on the grid conductor 21 of grid 24 of tube 25 which point is on the ground potential side of blocking condenser 23. Similarly, capacitor 36 is connected between the plate 31 of tube 25 and grid conductor 18 of grid 16, of tube 17 on the ground potential side of blocking condenser 20. It is then seen that, although all radio frequency components are present in the neutralizing circuits, those circuits are completely isolated from any high potential direct current component. When the circuit is energized by the presence of input energy, neutralizing condenser 35 feeds a voltage, opposite in phase to the voltage across the interelectrode capacity between the grid 24 and plate 31 of tube 25, from plate 30 of tube 17 to grid 24 of tube 25, thus neutralizing the effect of that interelectrode capacity. Similarly, neutralizing condenser 36 feeds a voltage, opposite in phase to that across the interelectrode capacity between grid 16 and plate 30 of tube 17, from plate 31 of tube 25 to grid 16 of tube 17, thus neutralizing that interelectrode capacity.

It may be said that the high potential across neutralizing condensers in the conventional circuits has been eliminated by my novel arrangement and transferred to the fixed blocking condensers. Since the blocking condensers are fixed and are of relatively small capacity, they may be more economically manufactured to withstand the high direct current potential than the larger adjustable neutralizing condensers could be manufactured. Further, since they do not need to be adjusted, the danger of high potential shock to the operator is minimized.

While there has been here described what is at present considered to be the preferred embodiment of the invention, it will be obvious to those skilled in the art that various changes and modifications may be made therein without departing from the scope of the invention as set forth in the appended claims.

What is claimed is:

1. In a push-pull amplifier employing two triodes and two grid circuits each with a portion at direct current ground potential, means for cross neutralization including a neutralization capacitor connected between the plate of the first tube and a point in the portion of the grid circuit of the second tube at direct current ground potential and another neutralizing capacitor connected between the plate of the second tube and a point in the portion of the grid circuit of the first tube at direct current ground potential, capacitor means for isolating each of said grids from the portion of its respective circuit at direct current ground potential and for maintaining a negative bias thereon, and means for maintaining the plate circuits of both tubes at direct current ground potential.

2. A push-pull radio frequency amplifier comprising two triode tubes, output circuits and input circuits at direct current ground potential, means coupled between said input circuits and the grids of said tubes for isolating said grids from ground at direct current potential, means for maintaining the grids and cathodes of said tubes at negative direct current potential, and adjustable means coupled between said input and output circuits for neutralizing the plate-to-grid interelectrode capacities of said tubes whereby the neutralization may be adjusted without exposure to direct current potential.

3. In a radio frequency amplifier having at least one tube with a plate and grid and input and output circuits, an arrangement for preventing the presence of direct current potential across the neutralizing circuit comprising means for placing said plate and said output circuit at direct current ground potential, means for placing said input circuit at direct current ground potential, direct current isolating means coupled between said input circuit and said grid, means for maintaining the grid and cathode of said tube at negative direct current potential, and a neutralizing circuit connected between said plate and input circuit.

JOHN B. CARAWAY.

REFERENCES CITED

The following references are of record in the file of this patent:

UNITED STATES PATENTS

| Number | Name | Date |
|---|---|---|
| 1,820,832 | Ring | Aug. 25, 1931 |
| 1,940,986 | Wright et al. | Dec. 26, 1933 |
| 2,137,278 | George | Nov. 22, 1938 |
| 2,218,309 | Davis | Oct. 15, 1940 |
| 2,284,181 | Usselman | May 26, 1942 |
| 2,429,755 | Hallmark | Oct. 28, 1947 |